United States Patent
Ahlstrom

[11] Patent Number: 5,836,425
[45] Date of Patent: Nov. 17, 1998

[54] NON-SKID WHEEL CHOCK FOR IN LINE ROLLER BLADE SKATES

[76] Inventor: Thomas Robert Ahlstrom, 19542 E. Parker Sq. Dr., Parker, Colo. 80134

[21] Appl. No.: 685,291

[22] Filed: Jul. 23, 1996

[51] Int. Cl.$^6$ ............... B60T 1/00; A63C 1/02; A43B 21/36

[52] U.S. Cl. .............. 188/412; 280/11.3; 36/132; 188/32

[58] Field of Search .............. 36/132, 134, 135; 280/11.2, 11.27, 11.3, 825; 188/4 R, 32; 46/346.1

[56] References Cited

U.S. PATENT DOCUMENTS

| | | | |
|---|---|---|---|
| 3,861,697 | 1/1975 | Dolce | 280/825 |
| 4,355,474 | 10/1982 | Grim | 280/825 |
| 4,364,187 | 12/1982 | Melendez | 36/15 |
| 5,046,587 | 9/1991 | Jones | 188/32 |
| 5,183,292 | 2/1993 | Ragin . | |
| 5,290,065 | 3/1994 | Kassal . | |
| 5,303,955 | 4/1994 | Zurnamer . | |
| 5,383,639 | 1/1995 | Byavd | 188/3 |
| 5,445,415 | 8/1995 | Campbell . | |
| 5,503,433 | 4/1996 | Lachapelle | 188/4 R |
| 5,573,275 | 11/1996 | Smith et al. | 280/825 |

*Primary Examiner*—Matthew C. Graham
*Assistant Examiner*—Chris Schwartz

[57] ABSTRACT

A flexible molded block for immobilizing the wheels of an in-line roller blade skate which is portable and easy to use. The device is a flexible chock "10" with a cavity "12" in the center which cradles a wheel of an in-line skate that it is installed on. The device immobilizes the skate wheel and removes the stress and weight from the skate wheel, axle, and bearings by resting on a frame assembly "18" of a skate. The wheel chock cavity lip "12*a*" that is produced by using a in-line roller blade skate wheel when making the molded chock, keeps the chock on the skate, preventing it from slipping or sliding off. The device is also small, light weight and easy to store when not in use.

3 Claims, 1 Drawing Sheet

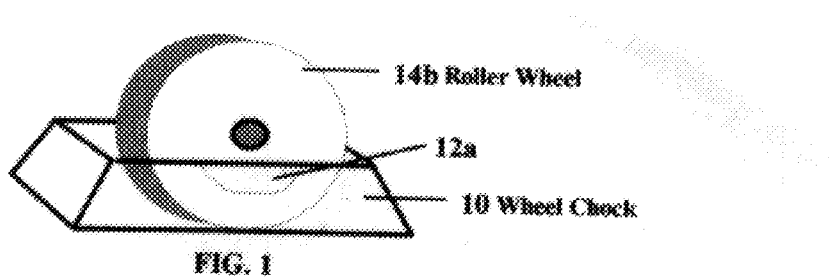
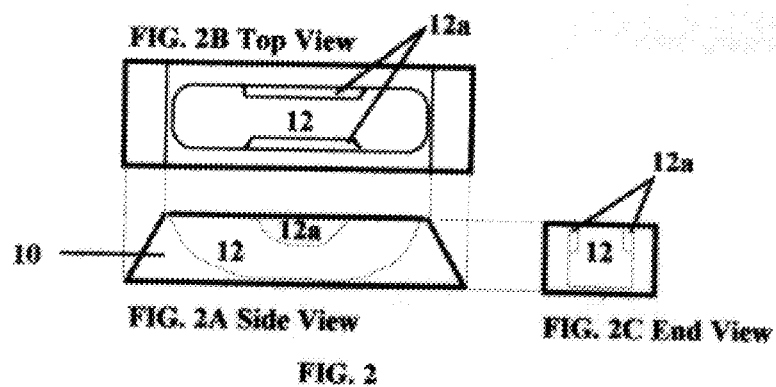
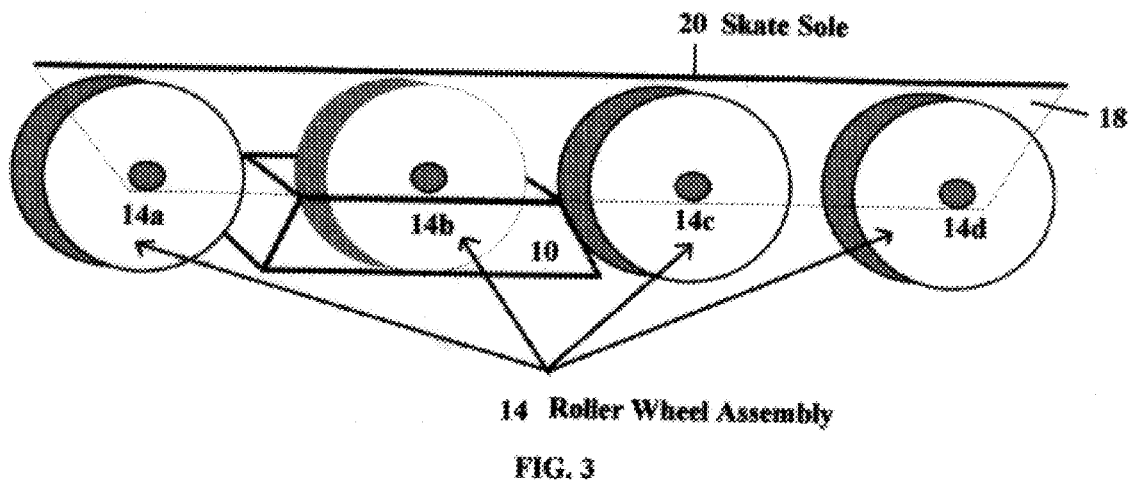

NON-SKID WHEEL CHOCK FOR IN LINE ROLLER BLADE SKATES

BACKGROUND—FIELD OF THE INVENTION

This invention relates to in-line roller blade skates, specifically to a wheel chock to help immobilize the wheels of an in-line roller blade skate when the user desires to walk while wearing the skates.

BACKGROUND—DESCRIPTION OF PRIOR ART

With the increasing use of in-line roller skates, there is a need for a simple, easy to use, and portable wheel cover. Most businesses forbid roller skates of any kind on their premises, and therefore a skater must either remain outside or remove the skates before entering. This is frustrating for both skater and the business man.

What is needed is a device that can be mounted on the in-line skate quickly and easily to immobilize the wheels and provide a walking surface, allowing the skater to walk safely while wearing the skates. The device should remove the weight and stress from the wheel, axle, and bearings and distribute this weight to the frame of the skate. The device should also be easy to store when not in use.

A cover for the wheels of a roller skate is taught by Grim in U.S. Pat. No. 4,355,474. The patent addresses the problem of covering the wheels of a conventional roller skate. Grim teaches a sheet type cover which hooks to the end of the skate structure mounting, covering the spaced pairs of wheels with a flat, rectangular sheet. The sheet cover provides a surface or sole in which a skater may walk, when not on the skating rink. The roller skate sole of the patent is not practical for use on a roller blade skate because of the wheel alignment of the skate.

Ragin III, U.S. Pat. No. 5,183,292 addresses the way to provide a pad which will allow one to walk on a surface while wearing a roller in-line skate type configuration. The pad can be somehow attached in a cumbersome way to the boot of the device or actually worn when the skates are removed as sandals. Again, this device is not easily storable and not easily adjustable without the removal of varying screw configurations. This device also places all weight and stress on the wheels, axle's, and bearings of the skate.

Kassal discloses a roller blade skate wheel cover in U.S. Pat. No. 5,290,065. This patent addresses an in-line skate configuration but provides a bulky device which when removed is cumbersome to store, and is not easily adjustable for varying lengths of skates. This device is also cumbersome and not easy to attach in a hurry. This device also places all weight and stress on the wheels, axle's, and bearings of the skate.

Anderson et al, U.S. Pat. No. 5,236,224 relates to a walker attachment for in-line skates. The device is a solid cumbersome piece which snaps on to an in-line blade to allow one to walk on a level surface. Again, once the device is removed it is cumbersome to hold and store. Further, the device places all weight and stress on the wheels, axle's, and bearings of the skate.

Campbell, U.S. Pat. 5,445,415 addresses a way to provide a cover that will help immobilize the wheels of an in-line skate. The device is a wheel cover that somehow hangs on to the leg when not in use. This could become cumbersome and irritating after a short period of time. This device still puts all stress and weight on the wheels, axle's, and bearings of the skate.

OBJECTS AND ADVANTAGES

Accordingly, several objects and advantages of the present invention are:

(a) to provide a simple non-skid chock for a wheel of an in-line roller blade skate that helps to immobilize the wheels of the skate when attempting to walk with the skates on;

(b) to provide a device that places most of the stress and weight on the frame of the skate instead of the wheel, axle, and bearings.

(c) to provide a portable device that is easily attached or installed for use;

(d) To provide a smaller non cumbersome device that is easily stored or carried when not in use; "Further objects and advantages of my invention will become apparent from a consideration of the drawings and ensuing description."

DRAWING FIGURES

In the drawings, closely related figures have the same number but different alphabetic suffixes.

FIG. 1 Shows the wheel chock device with wheel inserted.

FIG. 2 Shows a 3 dimensional view drawing of the wheel chock device.

FIG. 2A Shows the side view of the wheel chock with a cut away view of the wheel cavity.

FIG. 2B shows the top view of the wheel chock with the wheel cavity in the center and cavity lip.

FIG. 2C Shows the end view of the wheel chock with a cut away view of the wheel cavity.

FIG. 3 shows a typical in-line roller blade skate wheel assembly with the chock in place.

REFERENCE NUMERALS IN DRAWINGS

10 Wheel chock 12 Molded cavity slot in chock
12a Chock cavity lip 14 Roller Wheel Assembly
14a Front wheel 14b 2nd wheel from front
14c 3rd wheel from front 14d Back wheel of skate
18 Wheel frame assembly 20 Base or sole of skate

DESCRIPTION—FIGS. 1 to 3

A typical embodiment of the present invention is illustrated in FIGS. 1, 2 and 3. FIG. 1 shows a perspective view of a basic version of my wheel chock with a wheel of an in-line skate positioned or installed in it. FIG. 2 show different views of a wheel chock and its key parts, FIG. 2A (side view) and FIG. 2B (top view) and FIG. 2C (end view). FIG. 3 shows how a wheel chock is positioned on a wheel of an in-line roller blade skate.

In FIG. 1 wheel chock 10 is a flexible solid material molded from urethane with a cavity 12 slightly larger than ½ half of the circumference of a roller wheel of an in-line skate. Chock cavity 12 is the exact mold of ½ the exterior of a roller blade wheel which includes any beveled, curved or rounded characteristic of the exterior of a wheel. Cavity 12 of wheel chock 10 contains a cavity lip 12a which is formed from the curved indentation of the exterior of a wheel when the mold was made. Lip 12a acts as a locking tab that firmly holds wheel chock 10 onto a wheel 14b, preventing it from sliding or slipping off.

Additional views are shown in FIG. 2, 2a, 2b, 2c, and 3. FIG. 2 shows a wheel chock (side view FIG. 2a,) (top view FIG. 2b) and (end view FIG. 2c). FIG. 2b shows a wheel chock cavity lip 12a that holds chock 10 onto and immobilizing wheel 14b.

In FIG. 3 a in-line skate is attached by a skate sole 20 directly to a skate frame assembly 18 which includes wheels 14a, 14b, 14c, 14d, bearings, and axle's. FIG. 3 shows wheel chock 10 cradling wheel load bearing 14b in cavity 12. Skate frame assembly 18 is shown resting on and being supported by wheel chock 10 removing most of the stress and weight from the skates wheels 14a, 14b, 14c, 14d, wheel bearings, and axle's.

OPERATION—FIGS. 1, 2, 3

The manner of using an in-line roller blade skate chock to immobilize wheels when walking is desired is to take wheel chock 10 shown in FIG. 3 and snap over load bearing wheel 14b until securely installed. To remove wheel chock 10 from wheel 14b, grasp chock 10 in hand and pull off wheel 14b. Chock can be stored in user's pocket.

SUMMARY, RAMIFICATIONS, AND SCOPE

Thus the reader will see that my wheel chock provides an easy to use wheel immobilizing device that can be used by all persons that use in-line roller blade skates. In addition, by removing the stress and weight from the wheels of an in-line skate it will help provide a more secure walking environment while wearing in-line roller blade skates. Furthermore my wheel chock provides additional advantages in that;

It is lightweight.

It is easy to install and remove.

It is easy to store when not in use.

It provides a non skid type surface that does not elevate the skate higher then its present height.

Although the description above contains many specificity's, these should not be construed as limiting the scope of the invention but as merely providing illustrations of some of the presently preferred embodiments of this invention. For example, the wheel chock could consist of other material that would be non skid, flexible, bent without fracturing, such as vinyl, nylon, rubber, various plasticized materials, etc.

Thus the scope of the invention should be determined by the appended claims and their legal equivalents, rather than by the examples given.

I claim:

1. A flexible immobilizing chock for temporary attachment on a wheel of an in-line roller skate, said chock comprising:

(a) a molded block having two side walls and two end walls and a cavity for receiving said wheel of said in-line skate;

(b) said cavity of said chock having the size and shape of approximately half the circumference of one of the skates wheels, said cavity further comprising at least one lip formed on at least one of the internal walls of said cavity, said lip adapted to secure said chock to a wheel of an in-line roller skate;

(c) said chock being of one piece and formed of flexible material and is of such a size and construction that it may be stored in the pocket of the skate user.

2. The flexible chock claimed in claim 1, wherein said chock, upon attachment, is capable of removing most of the stress and weight from the wheel, axle and bearings of an in-line roller skate.

3. The flexible chock claimed in claim 1, wherein said chock is adapted to cradle the wheel of an in-line roller skate upon its attachment thereto by a user, said chock further having a flat base supporting surface for stabilizing a user of said skate on a surface walked upon.

* * * * *